United States Patent
Zhang et al.

(10) Patent No.: US 11,096,149 B2
(45) Date of Patent: Aug. 17, 2021

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Zhang Zhang, Beijing (CN); Marco Belleschi, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 359 days.

(21) Appl. No.: 16/094,066

(22) PCT Filed: Aug. 10, 2018

(86) PCT No.: PCT/SE2018/050812
§ 371 (c)(1),
(2) Date: Oct. 16, 2018

(87) PCT Pub. No.: WO2019/032035
PCT Pub. Date: Feb. 14, 2019

(65) Prior Publication Data
US 2021/0051628 A1    Feb. 18, 2021

(30) Foreign Application Priority Data

Aug. 11, 2017  (WO) ................ PCT/CN2017/097100

(51) Int. Cl.
*H04W 72/04*    (2009.01)
*H04W 72/02*    (2009.01)
*H04W 8/24*     (2009.01)
*H04W 28/26*    (2009.01)
*H04W 72/12*    (2009.01)
*H04W 92/18*    (2009.01)

(52) U.S. Cl.
CPC ............. *H04W 72/02* (2013.01); *H04W 8/24* (2013.01); *H04W 28/26* (2013.01); *H04W 72/121* (2013.01); *H04W 72/1257* (2013.01); *H04W 92/18* (2013.01)

(58) Field of Classification Search
None
See application file for complete search history.

(56) References Cited

U.S. PATENT DOCUMENTS 9,648,653 B2 *  5/2017  Kim ...................... H04W 76/14
2016/0057604 A1 * 2/2016 Luo ....................... H04W 8/005
                                                     370/330

OTHER PUBLICATIONS

Written Opinion dated Nov. 12, 2018 issued in International Application No. PCT/SE2018/050812. (10 pages).

(Continued)

*Primary Examiner* — Willie J Daniel, Jr.
(74) *Attorney, Agent, or Firm* — Rothwell, Figg, Ernst & Manbeck, P.C.

(57) ABSTRACT

Embodiments herein relate to a method performed by a radio network node for handling communication of wireless devices in a wireless communication network (1). The radio network node configures pools of radio resources for wireless devices to use based on a mode and a capability of the wireless devices, wherein the mode is a resource mode defined by manner of selecting radio resources and the capability is related to sidelink capability of the wireless devices.

23 Claims, 12 Drawing Sheets

(56) References Cited

OTHER PUBLICATIONS

3GPP TS 22.185 V14.2.1 (Nov. 2016), 3rd Generation Partnership Project; Technical Specification Group Services and System Aspects; Service Requirements for V2X services; Stage 1 (Release 14), Nov. 2016, 14 pages.
ETSI TS 136 213 V14.2.0 (Apr. 2017), Technical Specification, LTS; Evolved Universal Terrestrial Radio Access (E-UTRA); Physical layer procedures (3GPP TS 36.213 version 14.2.0 Release 14), Apr. 2017, 456 pages.
3GPP TSG RAN Meeting #75, RP-170798, Dubrovnik, Croatia, Mar. 6-9, 2017, Huawei et al., "New WID on 3GPP V2X Phase 2", Document for Approval, 5 pages.
3GPP TSG RAN Meeting #75, RP-170798, Dubrovnik, Croatia, Mar. 6-9, 2017, Time Budget Request Worksheet, 9 pages.
ETSI TS 136 321 V14.2.1 (May 2017), Technical Specification, LTE; Evolved Universal Terrestrial Radio Access (E-UTRA); Medium Access Control (MAC) protocol specification (3GPP TS 36.321 version 14.2.1 Release 14), May 2017, 108 pages.
3GPP TSG RAN WG1 Meeting #89, R1-1707450, Hangzhou, China, May 15-19, 2017, CATT, "Discussion on resource pool sharing between mode 3 and mode 4", Document for Discussion and Decision, 3 pages.
ETSI TS 136 331 V14.2.2 (May 2017), Technical Specification, LTE; Evolved Universal Terrestrial Radio Access (E-UTRA); Radio Resource Control (RRC); Protocol specification, (3GPP TS 36.331 version 14.2.2 Release 14), May 2017, 727 pages.
3GPP TSG RAN WG1 Meeting #89, R1-1708942, Hangzhou, China, May 15-19, 2017, Ericsson, "Radio resource pool sharing between mode 3 and mode 4 UEs", Document for Discussion and Decision, 4 pages.
International Search Report dated Nov. 12, 2018 issued in International Application No. PCT/SE2018/050812. (5 pages).
CATT, "Discussion on resource pool sharing between mode 3 and mode 4", 3GPP TSG RAN WG1 Meeting #89; R1-1707450; Hangzhou, China (May 15-19, 2017). (3 pages).
Ericsson, "Radio resource pool sharing between mode 3 and mode 4 UEs", 3GPP TSG RAN WG1 Meeting #89; R1-1708942; Hangzhou, China (May 15-19, 2017). (4 pages).
ZTE, "Considerations for shared resource pool between mode 3 and mode 4", 3GPP TSG RAN WG1 Meeting #89; R1-1707213; Hangzhou, P.R. China (May 15-19, 2017). (3 pages).

\* cited by examiner

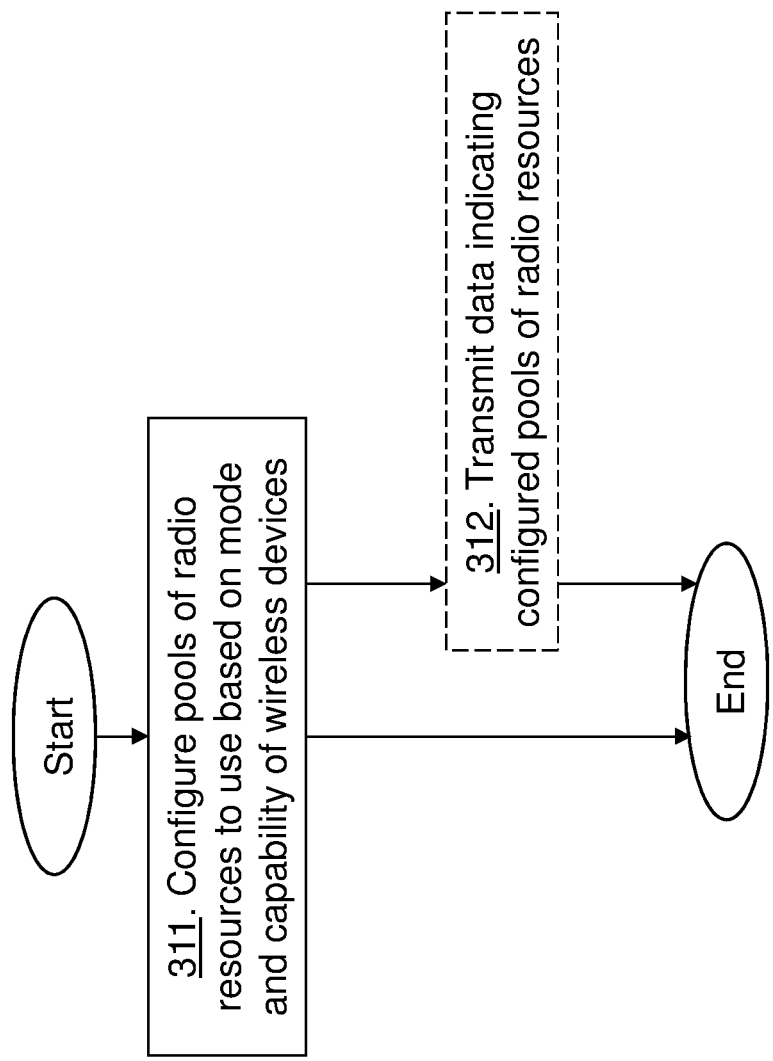

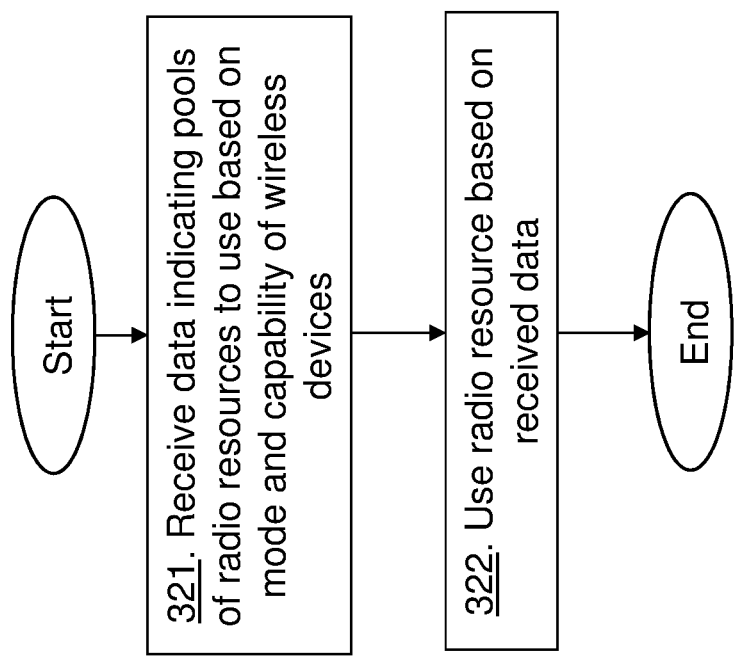

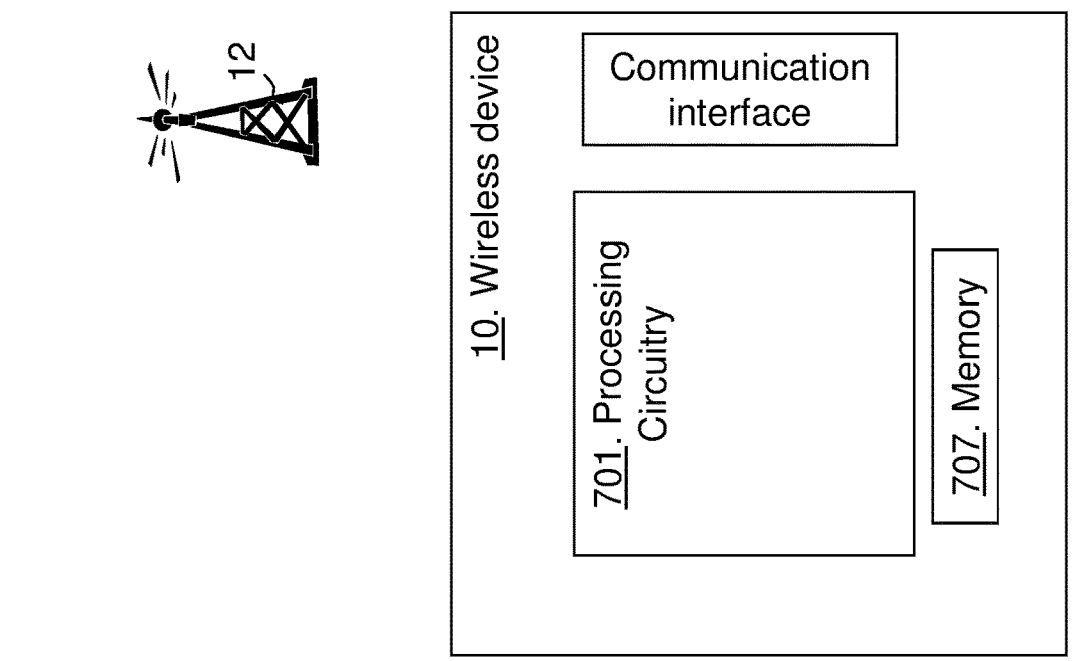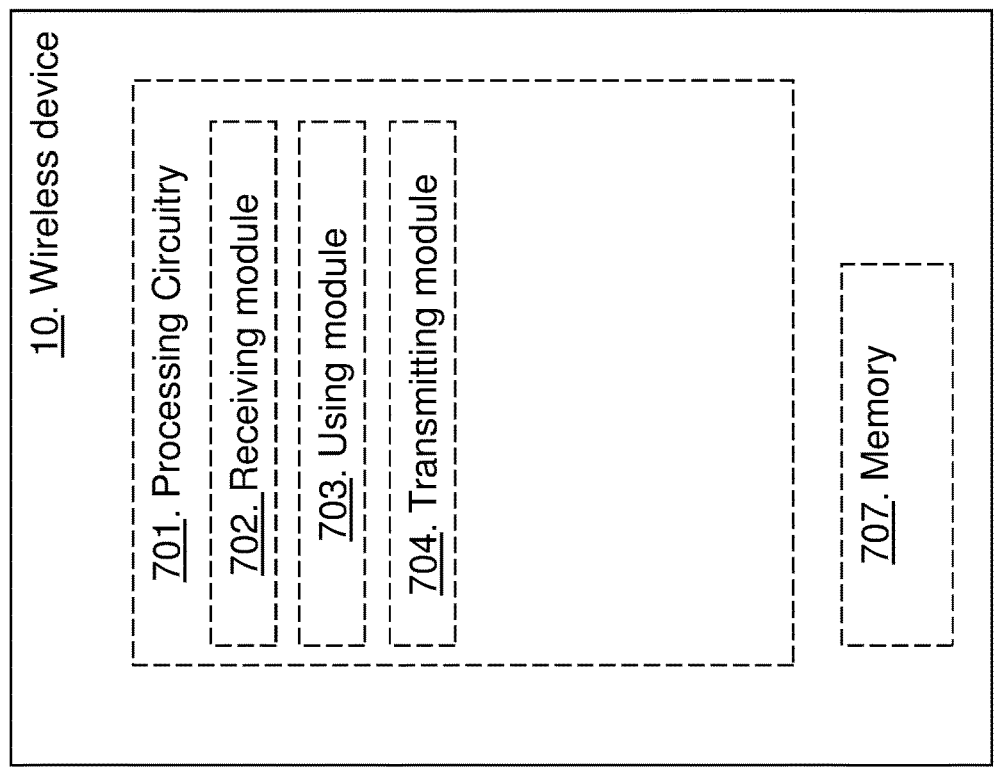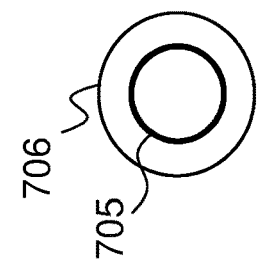
Fig. 7

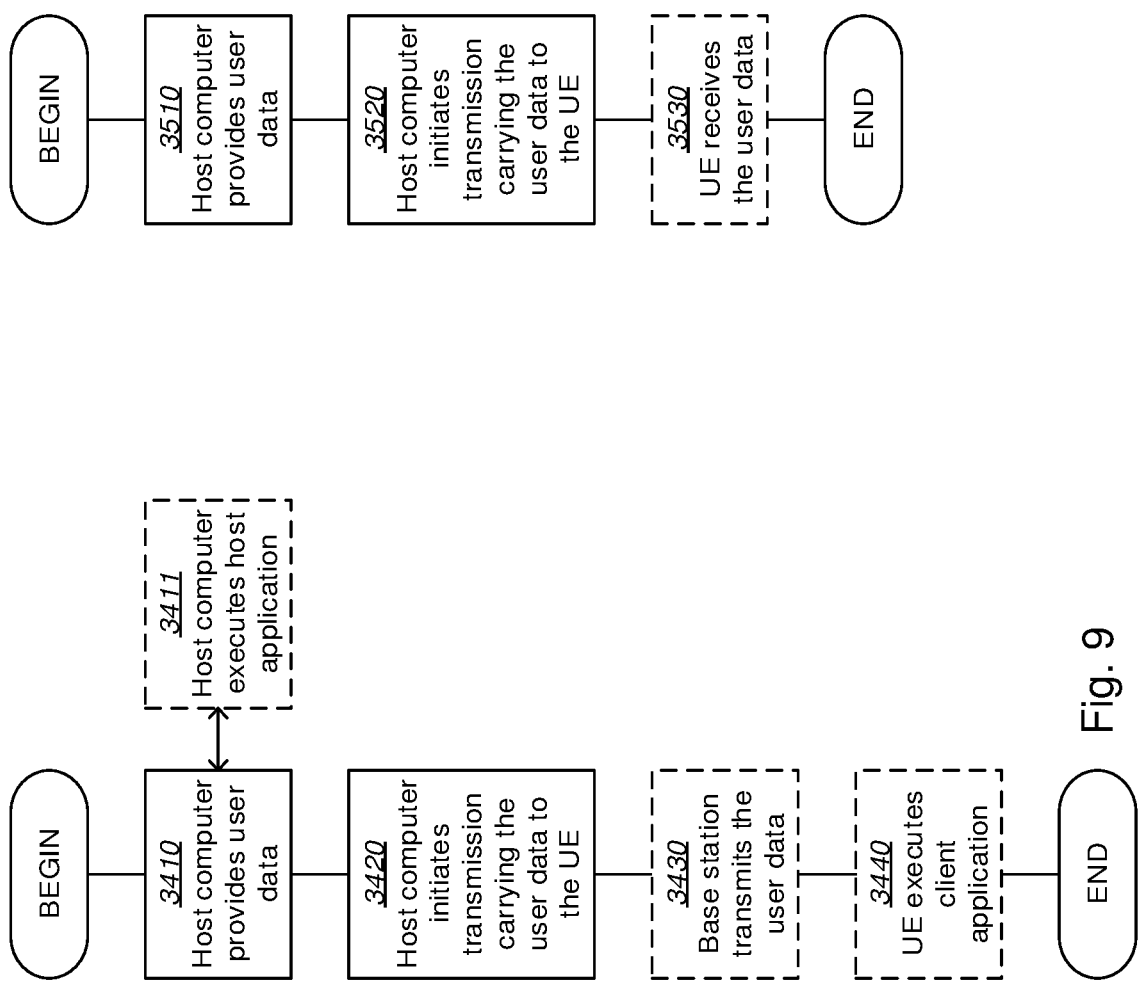

RADIO NETWORK NODE, WIRELESS DEVICE AND METHODS PERFORMED THEREIN

CROSS REFERENCE TO RELATED APPLICATION(S)

This application is a 35 U.S.C. § 371 National Stage of International Patent Application No. PCT/SE2018/050812, filed Aug. 10, 2018, designating the United States and claiming priority to International Application No. PCT/CN2017/097100, filed Aug. 11, 2017. The above identified applications are incorporated by reference.

TECHNICAL FIELD

Embodiments herein relate to a wireless device, a radio network node and methods performed therein for communication. Furthermore, a computer program product and a computer readable storage medium are also provided herein. In particular, embodiments herein relate to handling communication of wireless devices in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an evolved NodeB (eNodeB), or a gNodeB. A service area also known as cell or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UTRAN, several radio network nodes may be connected, e.g., by landlines or microwave, to another radio network node e.g. a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

3GPP uses a system of parallel "Releases" which provides developers with a stable platform for the implementation of features at a given point and then allow for the addition of new functionalities in subsequent Releases. In Release (Rel)-14, the extensions for the device-to-device work consist of support of Vehicle to Anything (V2X) communication, which includes any combination of direct communication between vehicles, pedestrians and infrastructure. V2X communication may take advantage of a network (NW) infrastructure, when available, but at least basic V2X connectivity should be possible even in case of lack of coverage. Providing an LTE-based V2X interface may be economically advantageous because of the LTE economies of scale and it may enable tighter integration between communications with: the NW infrastructure in e.g. vehicle to infrastructure (V2I); pedestrians in vehicle to pedestrian (V2P) and other vehicles in vehicle to vehicle (V2V), as compared to using a dedicated V2X technology, e.g. IEEE 802.11p.

V2X communications may carry both non-safety and safety information, where each of the applications and services may be associated with specific requirements sets, e.g., in terms of latency, reliability, data rates etc.

There are several different use cases defined for V2X, see FIG. 1:
- V2V: covering LTE-based communication between vehicles, either via Uu or sidelink e.g. interface PC5.
- V2P: covering LTE-based communication between a vehicle and a device carried by an individual (e.g. handheld terminal carried by a pedestrian, cyclist, driver or passenger), either via Uu or sidelink, e.g. interface PC5.
- Vehicle-to-infrastructure/network (V2I/N): covering LTE-based communication between a vehicle and a roadside unit/network. A roadside unit (RSU) is a transportation infrastructure entity, e.g. an entity transmitting speed notifications, that communicates with V2X capable wireless devices over sidelink (PC5). For V2N, the communication is performed on Uu.

Sidelink Resource Allocation for V2X

The device to device (D2D) interface is called the sidelink. There are two different resource allocation (RA) procedures for V2X on the sidelink, i.e. centralized RA, so called "mode 3", and distributed RA, so called "mode 4", see TS 36.321 V14.2.1, "Medium Access Control (MAC) protocol specification (Release 14)". The transmission resources are selected within a resource pool which is predefined or configured by the network (NW). Transmission resources or radio resources are e.g. time and/or frequency resources.

With centralized RA, i.e. mode-3, the sidelink radio resource for transmission is scheduled or allocated by the NW and signaled to wireless device using Downlink Control information (DCI) format 5A. This is the case for both control channels i.e. physical sidelink control channel (PSCCH) which is used to deliver sidelink control information (SCI) also called scheduling assignment (SA) and physical sidelink shared channel (PSSCH) which is used to deliver sidelink data.

With distributed RA, i.e. mode-4, each wireless device independently decides which radio resources to use for each transmission based on sensing of SCI sent by the other wireless devices, for both PSCCH and PSSCH. Such radio resources are selected by the wireless device from one or more pools of resources which are provided by the NW using broadcast signaling, e.g. System Information Block (SIB) signaling, or by pre-configuration see TS 36.331 V14.1.0, "Radio Resource Control (RRC); Protocol specification (Release 14)".

The resource reservation field in SCI format 1 indicates the resource blocks being reserved for the current transmission or for a future transmission, which contributes to the determination of resource availability by the mode 4 wireless devices. For mode 3 transmissions the resource reservation field in SCI format 1 is currently always set to zero see TS 36.213, V14.2.0, "Physical layer procedures (Release 14)".

Future V2X enhancements, disclosed in RP-170798, "New WID on 3GPP V2X Phase 2", are ways to expand the LTE platform to the automotive industry, and the initial standard on support of V2V services was completed in September 2016. Further enhancements which address additional V2X operation scenarios leveraging the LTE cellular infrastructure is planned for future releases such as LTE Release 15. It is then expected that also New Radio (NR) will support V2X services in the context of 5G.

Currently, 3GPP SA1 working group has completed new service requirements for future V2X services in the Study on Enhancement of 3GPP support for V2X services (FS_eV2X). SA1 had identified 25 use cases for advanced V2X services which may be used also in 5G, i.e. LTE and NR). Such use cases are categorized into four use case groups: vehicles platooning, extended sensors, advanced driving and remote driving. The consolidated requirements for each use case group are captured in TR 22.886. For these advanced applications, the expected requirements to meet the needed data rate, reliability, latency, communication range and speed are made more stringent.

To support at least some of these advanced V2X services in LTE, a new work item on 3GPP V2X Phase 2 has started. The work item will specify solutions for the following PC5 functionalities, which can co-exist in the same resource pools as Rel-14 functionality and use the same scheduling assignment (SA) format, and which can be decoded by Rel-14 wireless devices, without causing significant degradation to Rel-14 PC5 operation compared to that of Rel-14 wireless devices supporting:

Carrier aggregation e.g. up to 8 PC5 carriers;
High order modulation, i.e. 64 Quadrature Amplitude Modulation (QAM);
Reduce the maximum time between packet arrival at Layer 1 and resource selected for transmission; and/or
Radio resource pool sharing between wireless devices using mode 3 and wireless devices using mode 4.

Radio resource pool sharing between mode 3 and mode 4 wireless devices could improve resource efficiency. This is because the number of wireless devices in different modes and/or traffic generated by wireless devices in different modes may vary with time, if mode 3 and mode 4 wireless devices share the same resource pool, the resources that are not used by mode 3 (or mode 4) wireless devices could be used by mode 4 (or mode 3) wireless devices, thus improve the resource efficiency. However, potential coexistence issues between the two modes may occur. This is because radio network nodes do not know what TX resources are selected by mode 4 wireless device(s), therefore the radio network node may schedule mode 3 wireless device(s) in TX resources already selected by mode 4 wireless device(s), in which case collision will occur, and performance of both mode 3 wireless device and mode 4 wireless device will suffer.

Several improvements have been discussed in 3GPP to handle the coexistence issues, such as in and R1-1708942, "Radio resource pool sharing between mode 3 and mode 4 UEs", Ericsson and R1-1707450, "Discussion on resource pool sharing between mode 3 and mode 4", CATT:

Activate the resource reservation field in SCI format 1 for mode 3 wireless devices (Rel. 15), i.e. if mode 3 wireless device is scheduled with Semi Persistent Scheduling (SPS), set the resource reservation field according to the actual SPS configuration. This helps mode 4 wireless devices to learn about mode 3 wireless devices' intention of resource utilization.

Giving higher priority to mode 3 wireless devices (Rel. 15). This could be implemented by adding a "mode" indicator in the SCI format 1 (e.g. using one of the reserved bits) so that (Rel. 15) mode 4 wireless devices exclude the resources reserved by mode 3 wireless devices from the list of available resources.

Mode 3 wireless device performs sensing and feedbacks the resource occupancy status, which is considered by the radio network node when performing scheduling for the mode 3 wireless device.

Radio network node broadcasts the resources scheduled for the mode 3 wireless devices, and the mode 4 wireless devices may then avoid using these resources for their transmissions.

Rel. 14 V2X does not include any optimized mechanism that can handle the coexistence issues between mode 3 wireless devices and mode 4 wireless devices in case a shared resource pool is configured. The improvements listed above can only be applied if at least one type of wireless devices, i.e. mode 3 wireless device or mode 4 wireless device, is a Rel. 15(+) wireless device. On the other hand, Rel. 14 wireless devices and Rel. 15(+) wireless devices will coexist for a long time, and simply configuring shared resource pool may cause significant degradation to Rel. 14 wireless devices' performance, e.g. the release of wireless device, leading to a limited or reduced performance of the wireless communication network.

SUMMARY

An object of embodiments herein is to provide a mechanism for improving performance of the wireless communication network.

According to an aspect the object is achieved by providing a method performed by a radio network node for handling or enabling communication of wireless devices in a wireless communication network. The radio network node configures pools of radio resources for wireless devices to use based on a mode and a capability of the wireless devices. The mode is a resource mode defined by manner of selecting radio resources e.g. selecting radio resources at the wireless device, i.e. mode 4, or selecting radio resources at the radio network node, i.e. mode 3. The capability is related to sidelink capability of the wireless devices such as capability to set a resource reservation field in SCI according to an SPS configuration, capability to set mode indicator in the SCI format, capability to sense and provide feedback whether a resource is occupied, and/or capability to receive indication of reserved resources and avoid using these. The capability may be defined by version of the wireless devices e.g. Rel-14 wireless devices or Rel-15 wireless devices. The pools may comprise at least two pools of radio resources, a first pool of radio resources configured to be used by wireless devices of a first mode, e.g. mode 3, and a first capability, e.g. Rel-14, and a second pool of radio resources configured to be used by wireless devices of a second mode, e.g. mode 4, and the first capability and/or a second capability, e.g. Rel-15 or a same first mode and the second capability. The radio network node may further transmit data or information such as a SIB to one or more wireless devices which data or information indicates the configured pools of radio resources.

According to another aspect the object is achieved by providing a method performed by a wireless device for handling or enabling communication of the wireless device in a wireless communication network. The wireless device receives data or information, such as a SIB, from a radio network node. The data or information indicates pools of radio resources for wireless devices to use based on a mode and a capability of the wireless devices. The mode is a resource mode defined by manner of selecting radio resources e.g. selecting radio resources at the wireless device, i.e. mode 4, or selecting radio resources at the radio network node, i.e. mode 3. The capability is related to sidelink capability of the wireless devices such as capability to set a resource reservation field in SCI according to an SPS configuration, capability to set mode indicator in the SCI format, capability to sense and provide feedback whether a resource is occupied, and/or capability to receive indication of reserved resources and avoid using these. The capability may be defined by version of the wireless devices e.g. Rel-14 wireless devices or Rel-15 wireless devices. The pools may comprise at least two pools of radio resources. The wireless device may then schedule or receive scheduling to use radio resources based on mode and/or capability of the wireless device as indicated in the received information or data.

It is furthermore provided herein a computer program product comprising instructions, which, when executed on at least one processor, cause the at least one processor to carry out any of the methods above, as performed by the radio network node or the wireless device. It is additionally provided herein a computer-readable storage medium, having stored thereon a computer program product comprising instructions which, when executed on at least one processor, cause the at least one processor to carry out the method according to any of the methods above, as performed by the radio network node or the wireless device.

Furthermore, a wireless device is herein provided for handling communication of the wireless device in a wireless communication network. The wireless device is configured to receive data from a radio network node, wherein the data indicates pools of radio resources for wireless devices to use based on a mode and a capability of the wireless devices, and wherein the mode is a resource mode defined by manner of selecting radio resources and the capability is related to sidelink capability of the wireless devices. The wireless device uses, based on the received data, one or more radio resources for communicating in the wireless communication network.

In addition, a radio network node is herein provided for handling communication of wireless devices in a wireless communication network. The radio network node is configured to configure pools of radio resources, for wireless devices, to use based on a mode and a capability of the wireless devices, wherein the mode is a resource mode defined by manner of selecting radio resources and the capability is related to sidelink capability of the wireless devices.

Embodiments herein also disclose a radio network node and a wireless device comprising respective processing circuitry configured to perform the methods herein.

Embodiments herein enable resource sharing between wireless devices of different modes using pools of radio resources, also denoted as resource pools, with little negative impacts on performance of wireless devices of different capabilities. The performance of first capability wireless devices, e.g. Rel. 15 wireless devices, may be improved for both first mode wireless devices e.g. mode 3 wireless devices and second mode wireless device e.g. mode 4 wireless devices while the performance of e.g. Rel. 14 wireless devices may also be improved by balancing resource usage between Rel. 14 wireless devices and Rel. 15 wireless devices. Hence, embodiments herein lead to an improved performance of the wireless communication network.

BRIEF DESCRIPTION OF THE DRAWINGS

Embodiments will now be described in more detail in relation to the enclosed drawings, in which:

FIG. 3b is a flowchart depicting a method performed by a radio network node according to embodiments herein;

FIG. 3c is a flowchart depicting a method performed by a wireless device according to embodiments herein;

FIG. 7 is a block diagram depicting a wireless device according to embodiments herein;

FIGS. 9-12 are flowcharts illustrating methods implemented in a communication system including a host computer, a base station and a user equipment.

DETAILED DESCRIPTION

Figure 1:
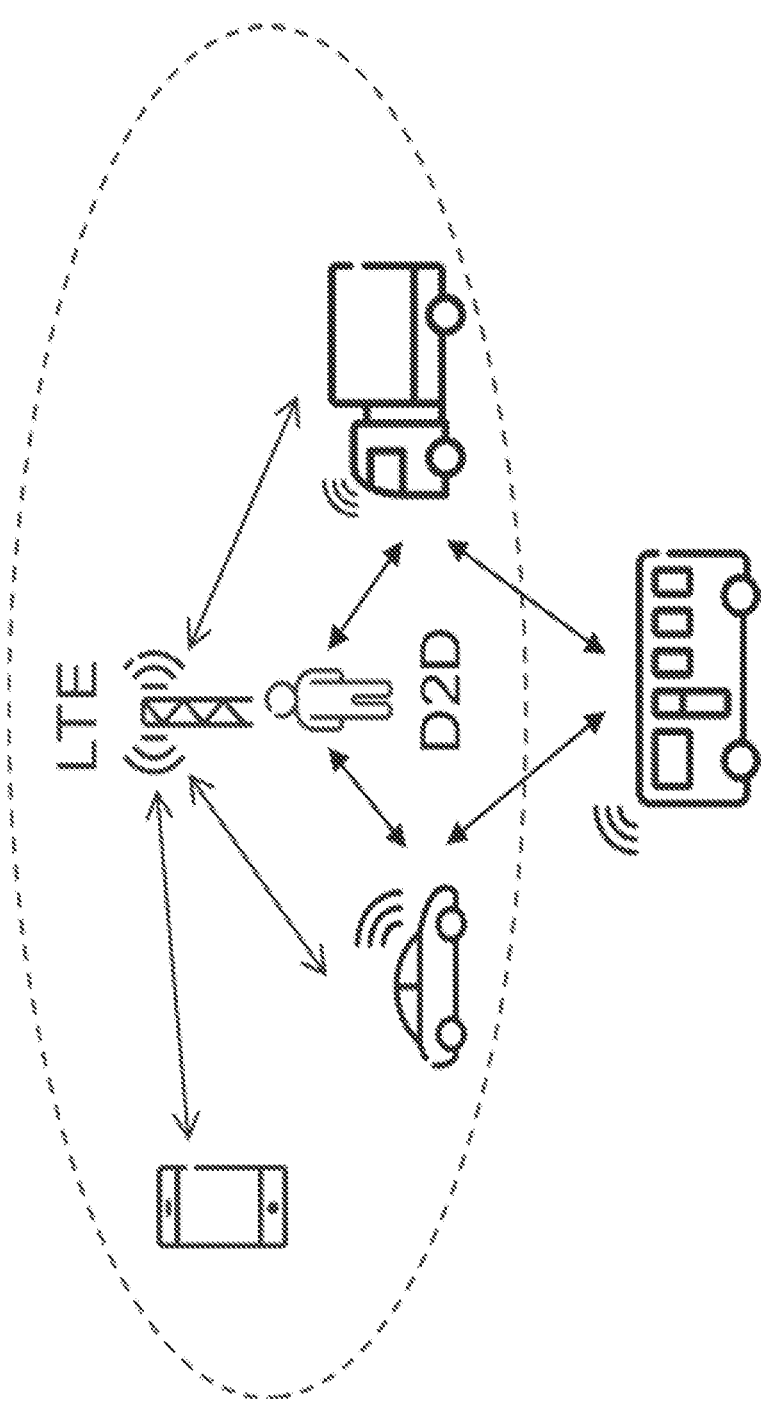
FIG. 1 is a schematic overview depicting a communication network according to prior art.
Figure 2:
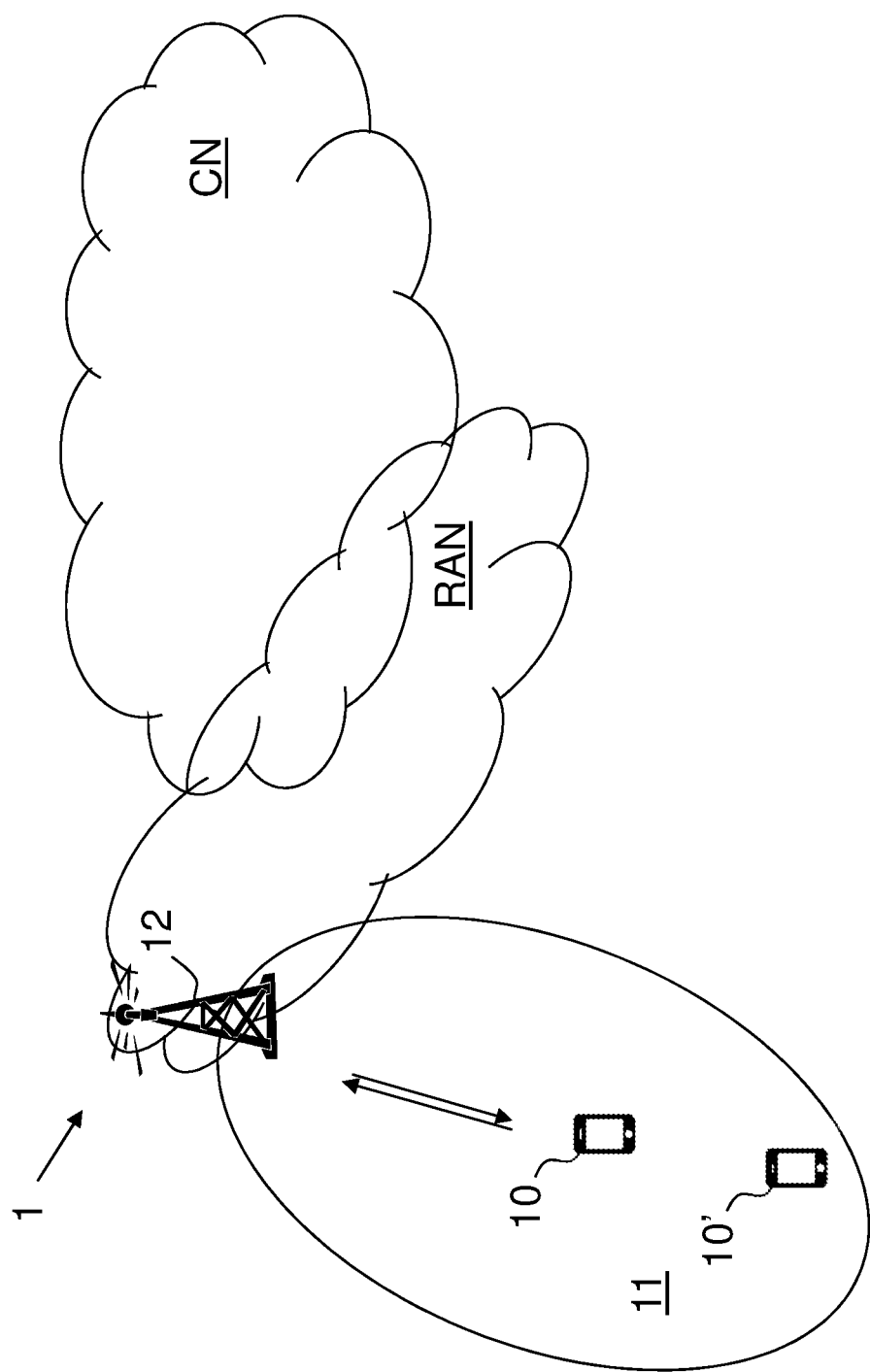
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs e.g. a first RAN (RAN1), connected to one or more CNs. The wireless communication network 1 may use one or a number of different technologies, such as Wi-Fi, Long Term Evolution (LTE), LTE-Advanced, New Radio (NR), Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments are applicable to 5G and also in further development of the existing communication systems such as e.g. 3G and LTE.

In the wireless communication network 1, wireless devices e.g. a first wireless device 10 or a second wireless device 10', such as mobile stations, non-access point (non-AP) STAs, STAs, user equipments and/or wireless terminals, are connected via the one or more RANs, to the one or more CNs or communicate with one another. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area. The first wireless device 10 is also denoted the wireless device 10 herein.

The wireless communication network 1 comprises a radio network node 12. The radio network node 12 is exemplified herein as a RAN node providing radio coverage over a geographical area, a service area 11, of a radio access technology (RAT), such as LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB or eNodeB), a gNodeB, a base transceiver station, Access Point Base Station, base station router, a transmission arrangement of a radio base station, a stand-alone access point or any other network unit capable of serving a wireless device within the service area served by the radio network node 12 depending e.g. on the radio access technology and terminology used and may be denoted as a scheduling node.

It should be noted that a service area may be denoted as cell, beam, beam group or similar to define an area of radio coverage.

The first wireless device 10 may be a wireless device of a first mode such as a mode of centralized RA (mode 3 wireless device) of a first capability such as a Rel-14 wireless device. The second wireless device 10' may be a wireless device of a second mode such as a mode of distributed RA (mode 4 wireless device) of a second capability such as a Rel-15 wireless device. The first capability may be defined by a version or release related to standardization of wireless devices and the second capability may be defined by a later version or release related to standardization of wireless devices. The wireless devices are configured to communicate via a sidelink also known as a device to device (D2D) connection.

According to embodiments herein the radio network node 12 configures pools of radio resources for wireless devices to use based on a mode and a capability of the wireless devices. The mode is a resource mode defined by manner of selecting radio resources e.g. selecting radio resources at the wireless device, i.e. mode 4, or selecting radio resources at the radio network node, i.e. mode 3. The capability is related to sidelink capability of the wireless devices such as capability to set a resource reservation field in SCI according to an SPS configuration, capability to set mode indicator in the SCI format, capability to sense and provide feedback whether a resource is occupied, and/or capability to receive indication of reserved resources and avoid using these. The capability may be defined by version of the wireless devices e.g. Rel-14 wireless devices or Rel-15 wireless devices. Each version (or release) of a wireless device defines certain capabilities of the wireless device. The pools may be at least two pools of radio resources, a first pool of radio resources configured to be used by wireless devices of a first mode, e.g. mode 3, and a first capability, e.g. Rel-14, and a second pool of radio resources configured to be used by wireless devices of a second mode, e.g. mode 4, or the first mode and the first capability and/or a second capability, e.g. Rel-15.

Since wireless devices of different capabilities, such as Rel. 14 wireless device and Rel. 15(+) wireless device, will coexist for a long time a solution is herein provided to configure resource pool sharing between these wireless devices without causing significant degradation to e.g. Rel. 14 wireless devices' performance. Methods are herein provided to perform resource sharing between wireless devices of different modes. The methods herein disclose:

Configuration of more than one pools of radio resources for e.g. mode 4 wireless devices, where: the pools may be configured to not completely overlap one another; Rel. 14 mode 4 wireless devices may only be configured with some of, i.e. not all, these pools; and Rel. 15(+) mode 4 wireless devices may be configured with any or all of these pools.

Rel. 14 mode 3 wireless devices are not allowed to be scheduled in resources in the pool configured for Rel. 14 mode 4 wireless devices. Some wireless devices such as Rel. 15 mode 3 wireless devices may feedback a capability indicator so that the radio network node knows whether the mode 3 wireless device is a Rel. 14 wireless device or a Rel. 15 wireless device and may then perform scheduling appropriately.

Resource sharing may only be applied to certain wireless device e.g. Rel. 15 mode 3 wireless devices adopting SPS.

Resource reselection may be adapted or revised for e.g. Rel. 15 mode 4 wireless devices when shared with mode 3 wireless devices. Different, e.g. shorter, resource reservation period may be used compared to Rel. 14 mode 4 wireless devices. Resource reselection may be triggered once a collision of radio resources is detected. Randomly selected transmission opportunities may be used for detecting collision. Or disallow resource sharing between e.g. Rel. 14 mode 3 wireless devices and Rel. 15 mode 4 wireless devices.

Resource usage may be balanced between Rel. 14 wireless devices and Rel. 15 wireless devices. Indicate sidelink capability over either radio interface such as Uu or sidelink so that the radio network node or the wireless devices may know a ratio of a second capability wireless devices, such as Rel. 15 wireless devices, active in the system.

Figure 3A:
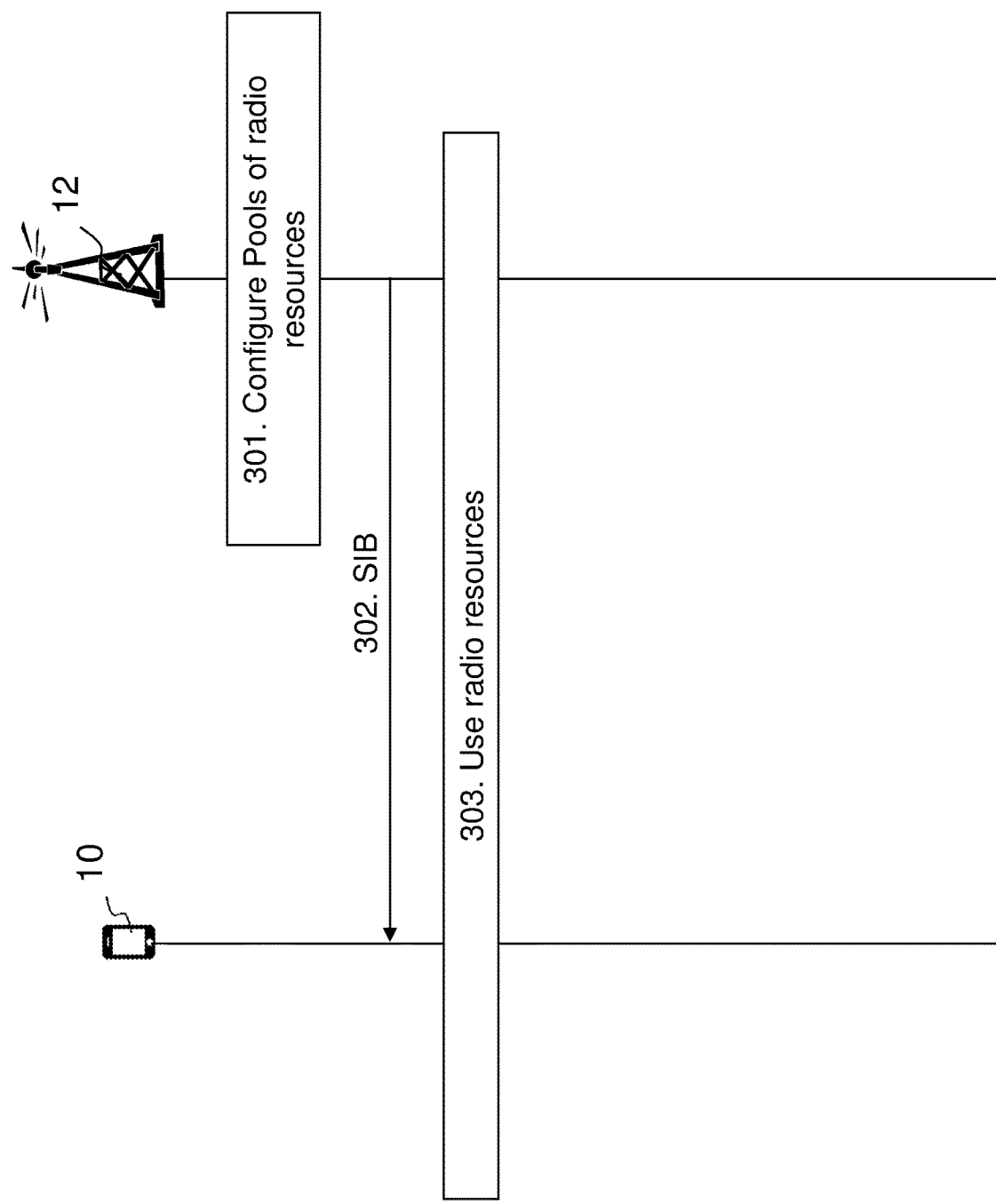
FIG. 3a is a combined flowchart and signaling scheme according to embodiments herein.

FIG. 3a is a combined signaling scheme and flowchart according to embodiments herein for handling communication from the wireless devices in the wireless communication network 1.

Action 301. The radio network node 12 configures the pools of radio resources for wireless devices to use based on the mode and the capability of the wireless devices. The pools may be at least two pools of radio resources, the first pool of radio resources configured to be used by wireless devices of the first mode, e.g. mode 3, and the first capability, e.g. Rel-14, and the second pool of radio resources configured to be used by wireless devices of the second mode, e.g. mode 4, and the first capability and/or the second capability, e.g. Rel-15. It should be noted that the radio network node 12 may configure more than one pool of one mode.

Action 302. The radio network node 12 then transmits e.g. a SIB indicating the pools or configuration that resources are grouped for wireless devices to use based on mode and capability of the wireless devices.

Action 303. The wireless device 10 then uses one or more radio resources based on the mode and/or capability of the wireless device as indicated in the received information or data.

The method actions performed by the radio network node for handling communication of wireless devices in the wireless communication network 1 according to embodiments will now be described with reference to a flowchart depicted in FIG. 3b. The actions do not have to be taken in the order stated below, but may be taken in any suitable order. Actions performed in some embodiments are marked with dashed boxes.

Action 311. The radio network node 12 configures pools of radio resources, for wireless devices, to use based on a mode and a capability of the wireless devices. The mode is a resource mode defined by manner of selecting radio resources and the capability is related to sidelink capability of the wireless devices. The resource mode may be defined by selecting radio resources at the wireless device or at the radio network node. The sidelink capability may be a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these. The sidelink capability may be defined by version of the wireless devices. The pools may comprise at least two pools of radio resources, wherein a first pool of radio resources is configured to be used by wireless devices of a first mode and a first capability, and a second pool of radio resources is configured to be used by wireless devices of a second mode and the first capability and/or a second capability, or of the first mode and the second capability. Furthermore, the radio network node 12 may configure different sets of possible values for an initial value of a resource reselection counter indicating how often radio resources should (may be) be reselected.

Action 312. The radio network node 12 may transmit data to one or more wireless devices e.g. the first wireless device 10 and/or the second wireless device 10', wherein the data indicates the configured pools of radio resources.

The method actions performed by the wireless device 10 for handling communication of the wireless device 10 in the wireless communication network 1 according to embodiments will now be described with reference to a flowchart depicted in FIG. 3c. The actions do not have to be taken in the order stated below, but may be taken in any suitable order.

Action 321. The wireless device 10 receives data from the radio network node 12, wherein the data indicates pools of radio resources for wireless devices to use based on a mode and a capability of the wireless devices. The mode is a resource mode defined by manner of selecting radio resources and the capability is related to sidelink capability of the wireless devices. The resource mode may be defined by selecting radio resources at the wireless device or at the radio network node. The sidelink capability may be a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these. The sidelink capability may be defined by version of the wireless devices. The pools may comprise at least two pools of radio resources, wherein a first pool of radio resources is configured to be used by wireless devices of a first mode and a first capability, and a second pool of radio resources is configured to be used by wireless devices of a second mode and the first capability and/or a second capability, or of the first mode and the second capability.

Action 322. The wireless device 10 uses, based on the received data, one or more radio resources for communicating in the wireless communication network 1. E.g. select radio resources based on the received data avoiding resources already scheduled or radio resources that might be scheduled. The wireless device 10 may use one or more radio resources of a pool based on the mode and/or capability of the wireless device.

Since e.g. legacy V2X communication in e.g. Rel. 14 does not include any optimized mechanism to handle the coexistence issues, and improvements cannot be introduced for Rel. 14 wireless devices, resource pool sharing should not be configured if both mode 3 wireless devices and mode 4 wireless devices are Rel. 14 wireless devices, to avoid significant performance degradation. One way to implement this is to configure more than one pool of the second mode, e.g. two mode 4 resource pools, which may be indicated in the SIB. Furthermore: the two mode 4 resource pools may not be completely overlapped; Rel. 14 mode 4 wireless devices may only be configured with one of these two mode 4 resource pools; Rel. 15(+) mode 4 wireless devices may be configured with any or both of these two mode 4 resource pools e.g. the same Rel. 15(+) mode 4 wireless device may use resources from both of the two mode 4 resource pools if both mode 4 resource pools are configured for it.

To avoid resource pool sharing between e.g. Rel. 14 mode 3 wireless devices and Rel. 14 mode 4 wireless devices, Rel. 14 mode 3 wireless devices may not be allowed to be scheduled in resources included in the pool where Rel. 14 mode 4 wireless devices are configured, while Rel. 15 mode 3 wireless devices could be scheduled anywhere, the resources are shared with mode 4 wireless devices if the resources scheduled for the Rel. 15 mode 3 wireless devices are (partly) overlapped with resources in any (or both) of the mode 4 resource pools. From signaling perspective, the radio network node 12 may explicitly indicate that a certain pool is not for use for wireless devices of a certain mode, such as mode 3. Or alternatively, the radio network node 12 may signal that the pool is used by wireless devices of the second mode, so that wireless devices that do not have the capability to e.g. detect collision of radio resources used by wireless devices of the second mode or which cannot use the resource reservation field in SCI to indicate their sidelink scheduling allocation, are not allowed to use radio resources of such pool. In yet another alternative of this embodiment, the radio network node 12 may signal a pool and explicitly indicate that this pool is shared between wireless devices of the first mode using SPS and capable of announcing their intention to transmit, e.g. on the resource reservation field, and wireless device of the second mode. A separate pool may be allocated for wireless devices that should use first mode without SPS, e.g. mode-3 dynamic scheduling, and that are not capable of indicating their transmission intention on the SCI, e.g. older release wireless devices which support the first mode but not resource reservation indication in the SCI. Such separate pool may be indicated either explicitly or with a bitmap which indicates, e.g. when the corresponding bit is set to 1, which of the resources indicated for shared usage of the first and second modes are reserved to wireless devices that are not configured with SPS and/or are not capable of indicating transmission intention in the SCI. Alternatively, the bitmap in e.g. SIB indicates, e.g. when the corresponding bit is set to 1, the resources reserved for shared use of wireless devices of different modes, and the other resources indicated by the bitmap, e.g. when the corresponding bit is set to 0, are reserved for wireless devices that are not configured with SPS and/or are not capable of indicating transmission intention in the SCI.

In case the network configuration is such that the two or more different pools are allocated for second mode and first mode use and that these two or more pools are partly overlapping, the wireless devices 10 of the first mode that are capable of announcing their transmission intention will announce in the SCI only if the wireless device 10 is scheduled in resources that overlap with the pool of resources in which wireless devices are capable of reading the SCI with resource reservation indication. Similarly, wireless devices of the second mode, which wireless devices are capable to read the SCI with new reservation field indication, will only monitor this field if they scheduled transmissions on resources overlapping with the pool of resources where wireless device of the first mode, e.g. capable of signaling the SCI, may transmit.

As an example to enable the above methods, a wireless device of the first mode but with the second capability, e.g. the second wireless device 10', may feedback a capability indicator to the radio network node 12 using dedicated signaling. The capability indicator may inform the radio network node 12 e.g. which capability, e.g. release also denoted as version, the wireless device belongs to. With this info the radio network node 12 may then perform scheduling of the first mode appropriately, e.g. avoid scheduling Rel. 14 mode 3 wireless devices in the pools where Rel. 14 mode 4 wireless devices are configured. In another option, there is not a specific "Rel. 15 indicator" in the capability signal, but the capability signal contains different capabilities, e.g. carrier aggregation capability or similar, which capabilities are specific of a version of wireless devices such as Rel-15 wireless devices.

One of the discussed improvements to handle the coexistence issues is to activate the resource reservation field in SCI format 1 for wireless device of the second capability and first mode. This improvement could work well when resource sharing is between e.g. Rel. 15 mode 3 wireless devices and mode 4 wireless devices, i.e. no Rel. 14 mode 3 wireless devices. On the other hand, this enhancement does not help if dynamic scheduling is adopted for wireless devices of the first mode, therefore the radio network node 12 may configure only wireless devices of the first mode and second capability adopting SPS to be scheduled in resources shared with wireless devices of the second mode. To handle the case of dynamic scheduling, i.e. the case in which the radio network node 12 provides a transmitting grant which is valid only for one single transmitting occasion, the radio network node 12 may indicate in the pool that is shared by wireless devices of different modes, a set of reserved resources in which wireless device of the second mode and/or wireless device of the first mode using SPS are not allowed to transmit. Such reserved resources may be used by the radio network node 12 to schedule some wireless devices with dynamic scheduling. In other words, wireless devices of the second mode may not consider such reserved resources as resources valid for transmission. Possibly also wireless devices of the first mode using SPS may skip transmitting on such reserved resources even if there is an SPS grant valid for transmission on those reserved resources. Such set of reserved resources may be signaled by the radio network node 12 using a bitmap where each bit indicates whether the corresponding Transmission Time Interval (TTI) is reserved or not starting from Subframe Number (SFN)=0. The bitmap can be for example a 40-bit bitmap which recur to cover the entire SFN space. The signaling of the reserved resources may also contain the set of Physical Resource Blocks (PRB) which are reserved.

Figure 4:
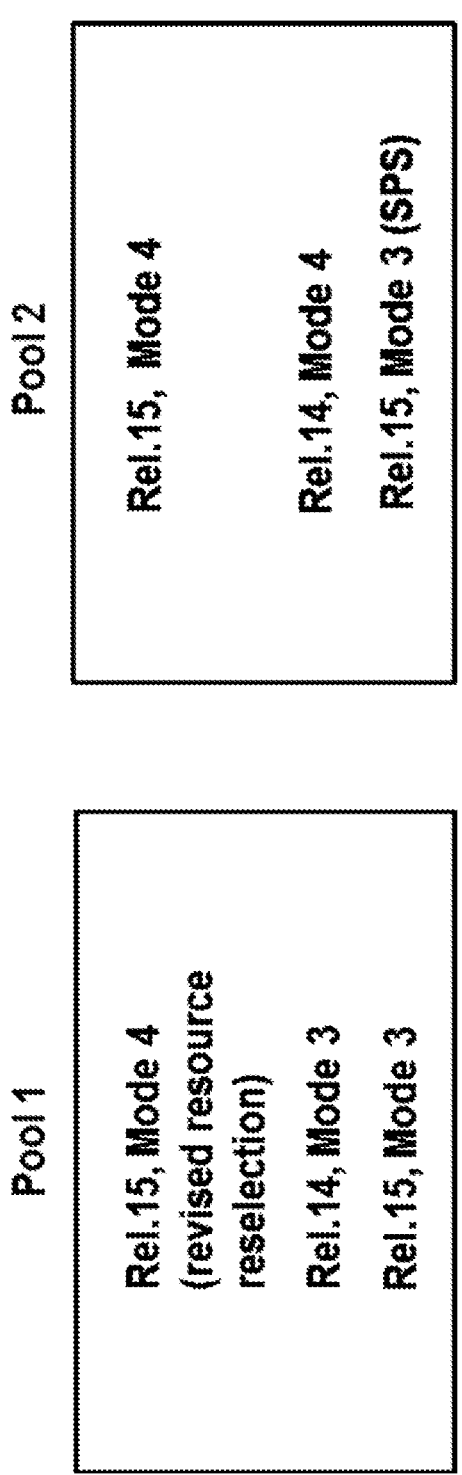
FIG. 4 is a schematic overview depicting a resource pools according to embodiments herein.
Figure 5:
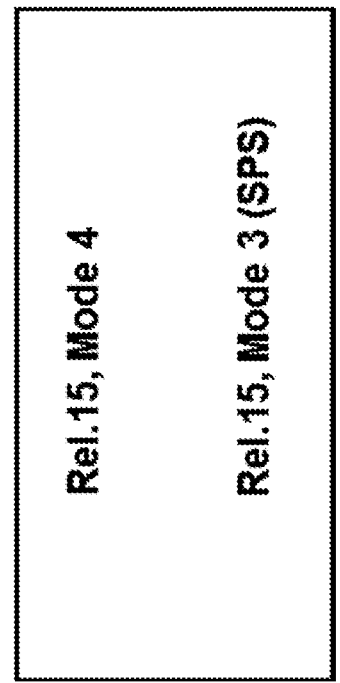
FIG. 5 is a schematic overview depicting a resource pools according to embodiments herein.

Further resource pool configurations and pool sharing scenarios are shown in FIG. 4 and FIG. 5.

One further improvement is that Rel. 15 wireless device 10 may indicate the sidelink capabilities, e.g. the release info, in Radio Resource Control (RRC) signaling and/or SCI using e.g. the reserved bits, by which the radio network node 12 and/or the other wireless devices know a ratio of wireless devices of the second capability. For scheduling of wireless devices of the first mode such as mode 3 wireless devices the radio network node 12 may determine in which pool a wireless device of the second capability may be scheduled, for instance a Rel. 15 mode 3 wireless device should be scheduled in pool 2 if there are a lot of Rel. 14 mode 3 wireless devices scheduled in pool 1. A Rel. 15 mode 4 wireless device may determine which pool it should prioritize during resource allocation, for instance pool 1 should be prioritized if there are a lot of Rel. 14 mode 4 wireless devices present in pool 2.

Alternatively or additionally, it is considered the case in which wireless devices of the second mode perform resource reselection more often if the pool is shared with wireless devices of the first mode. By performing resource reselection more often, possible collisions with wireless device of the first mode are minimized. In legacy operations, resource reselection is performed when a resource reselection counter reaches 0. The initial value of resource reselection is selected from a set of possible values which depend on the resource reservation interval, i.e. the periodicity of the resources selected by a wireless device.

In embodiments herein, the initial value of the resource reselection counter may depend not only by the periodicity of the resource reservation interval but also on the amount of wireless devices of the first mode which are populating the shared resource pool. For example, the radio network node 12 may configure different sets of possible values for the initial value of the resource reselection counter. One set depends on the periodicity of the traffic to be transmitted, another set depends on the amount of wireless devices of the first mode in the wireless communication network, i.e. different sets of values are configured for different amount of wireless devices of the first mode in a pool. E.g. the higher the number of mode-3 wireless devices, the smaller should be the possible values for the resource reselection counter. The number of wireless devices of the first mode may be signaled by the radio network node 12, or may be evaluated by wireless devices of the second mode by looking at the resource reservation field in the SCI, which SCI is sent by wireless devices of the first mode operating in a certain pool. In this latter option, the wireless devices of the second mode count the amount of wireless devices of the first mode which signals their presence over a certain configurable time interval, e.g. 1 sec. Alternatively, a wireless device of the second mode may evaluate how many wireless devices of the first mode are going to transmit in certain resource of interest, i.e. resources in which this wireless device of the second mode may be interested to transmit. In yet another alternative, a congestion metric, which may consider wireless devices of both modes, for the pool is used to determine which set to use for the resource reselection counter, e.g. different set of resource reselection values are used for different congestion level. For example, higher congestion levels correspond to shorter resource reselection values.

The resources reselection values may also be different for different pools. For example, the radio network node 12 may configure sets of small resource reselection values for small pools, with small number of available resources, which pools have higher probability of being congested.

In case the set of resource reselection values depending on the traffic periodicity, and the set of resource reselection values depending on the amount of wireless devices of the first mode are overlapping, the wireless device 10 may set the values from the overlapping part of these sets, otherwise the wireless device 10 may prioritize one set or the other according to, e.g. network prioritization, smallest (or highest) values in the two sets.

In another variant, regardless of the resource reselection counter selected by the wireless device, a wireless device of the second mode performs reselection as soon as a possible collision with a wireless device of the first mode is detected. E.g. the mode-4 wireless device monitors the SCI, and if the mode-4 wireless device realizes that a mode-3 wireless device has announced its transmission on resources which were previously reserved by this mode-4 wireless device, this mode-4 wireless device stops the current resource reselection counter and it reselects another set of resources which do not include the resources reserved by the mode-3 wireless device.

Wireless devices of the second mode may e.g. mute their transmissions in a few randomly selected transmission opportunities and perform sensing instead by which the collision, if exists, could be detected. If needed, e.g. for eV2X services requiring low latency, one shot grant could be scheduled to transmit packets which are originally to be transmitted in the muted transmission opportunities.

To realize this, the radio network node 12 configures wireless devices to randomly skip one, or more, transmission already scheduled, e.g. on a set of time and/or frequency resources that the wireless device has already selected for transmission. The wireless device may 10 randomly select with equal probability whether a single transmitting occasion should be skipped or not. Each single transmission occasion may have associated a probability of being skipped, which for example, according to network configuration, may depend on the congestion status of the pool, or on the amount of wireless devices of the first mode in the pool. If the randomly selected value is above, or below, such probability the wireless device skips that transmission occasion and performs sensing to detect if collisions are occurring. The probability of skipping a certain transmission occasion may also depend on the priority, e.g. ProSe Per Packet Priority (PPPP)/Logical Channel ID (LCID), and/or on the latency requirement of the packet the wireless device intends to transmit on that resource. Additional rules may be set by the configuration, e.g. the wireless device may at least mute on a certain percentage, (which depend on the packet priority/latency) of the total amount of resources that the wireless device 10 has selected for transmission, or the wireless device 10 may not mute transmissions on more than a certain percentage of the total amount of resources selected by the wireless device 10.

In another alternative of this embodiment, a wireless device such as the second wireless device 10', when selecting a set of transmitting resources, it may also select a set of resources from the above set of transmitting resources in which transmission will not occur.

In another alternative of this embodiment the wireless device 10 will not perform any transmission, e.g. padding bits, if in a sidelink buffer of the wireless device 10 there are no packets, e.g. Medium Access Control Protocol Data Units (MAC PDU), available for transmission in a certain transmitting occasion. Instead the wireless device 10 may perform sensing on such a transmitting occasion. To determine whether there are packets available for transmission for a certain transmitting occasion at e.g. TTI n, the wireless device 10 may check the buffer status at TTI n-x where x can be for example 1 ms or it can depend on the wireless device implementation. For example, it can be the time the wireless device 10 needs to process a certain packet at pass it at physical layer for transmission.

By following some of the above methods, the wireless device 10 may then skip sidelink transmission at certain time occasions. In order to compensate for possible throughput degradation effects, the wireless device 10 may transmit on one randomly selected resource before or after having skipped this sidelink transmission.

Upon performing sensing at TTI n on a resource which the wireless device has muted, following one of the above methods, the wireless device 10 may or may not detect collision (by reading the SCI) with one (or more) other wireless devices which selected the same resource for transmission for a future transmitting occasion. If, by reading the SCI, collision is also detected for a future transmitting occasion, the wireless device 10 may perform reselection on resources different from the ones signaled in the SCI of colliding wireless devices. In another alternative, the wireless device 10 does not perform reselection even if collision is detected for a future transmitting occasion, e.g. if the priority of the colliding packets, or the colliding wireless devices, is lower than the priority of the packet being transmitted by this wireless device 10. In yet another alternative, the wireless device 10 does not perform reselection but it mutes also the next transmitting occasion if that is going to collide again with the wireless devices detected at TTI n.

Figure 6:
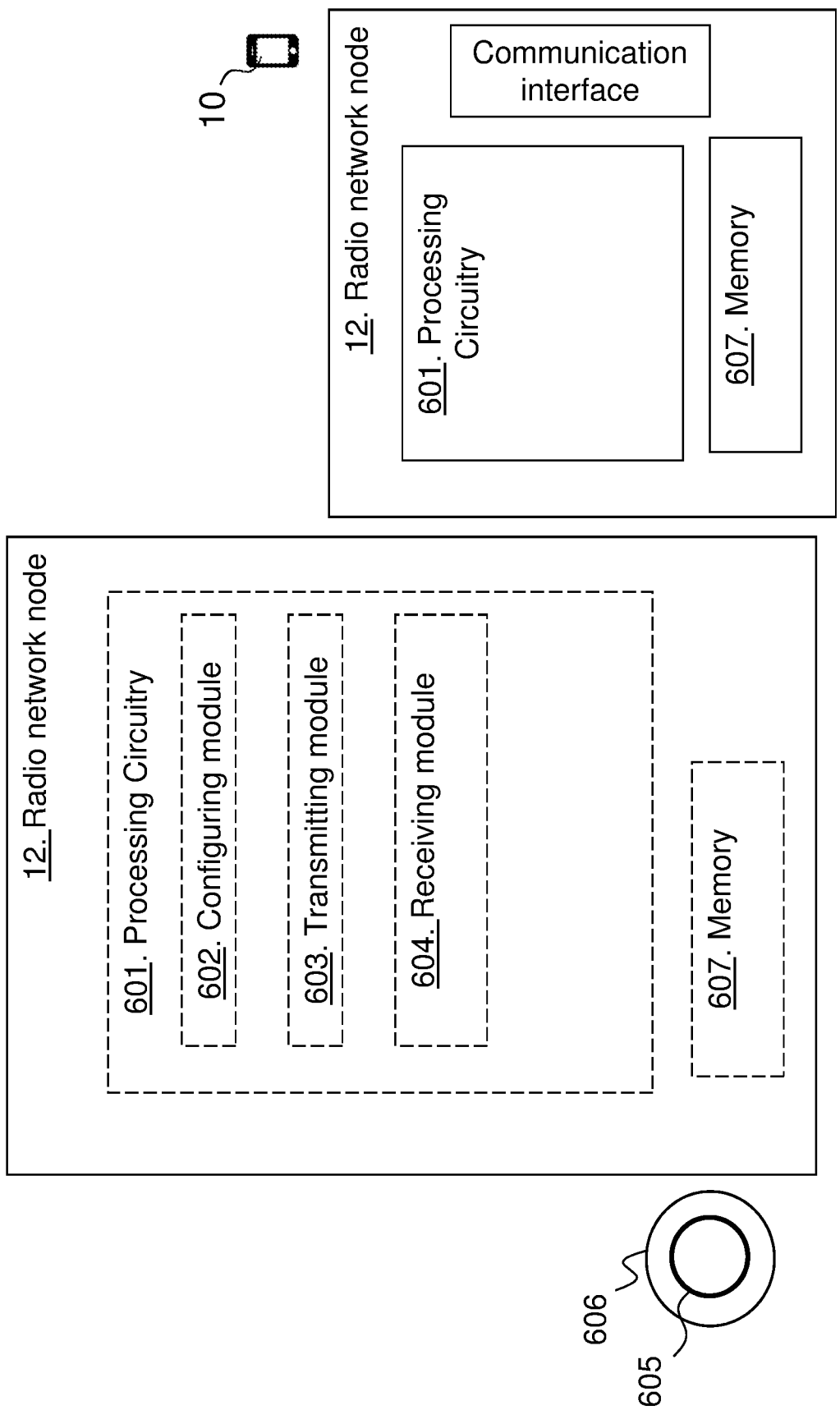
FIG. 6 is a block diagram depicting a radio network node according to embodiments herein.

FIG. 6 is a block diagram depicting the radio network node 12, in two embodiments, for handling or managing communication of wireless devices such as the first wireless device 10, in the wireless communication network 1.

The radio network node 12 may comprise processing circuitry 601, e.g. one or more processors, configured to perform the methods herein.

The radio network node 12 may comprise a configuring module 602. The radio network node 12, the processing circuitry 601, and/or the configuring module 602 is configured to configure pools of radio resources for wireless devices to use based on the mode and the capability of the wireless devices. The mode is the resource mode defined by manner of selecting radio resources e.g. selecting radio resources at the wireless device, i.e. distributed resource allocation or mode 4, or selecting radio resources at the radio network node, and i.e. centralized resource allocation or mode 3. The capability is related to sidelink capability of wireless devices such as capability to set a resource reservation field in SCI according to an SPS configuration, capability to set mode indicator in the SCI format, capability to sense and provide feedback whether a resource is occupied, and/or capability to receive indication of reserved resources and avoid using these. The capability may be defined by version of the wireless devices e.g. Rel-14 wireless devices or Rel-15 wireless devices. The pools may be at least two pools of radio resources, the first pool of radio resources and a second pool of radio resources configured to be used by wireless devices of different modes and/or different capabilities. The pools may comprise at least two pools of radio resources, wherein a first pool of radio resources is configured to be used by wireless devices of a first mode and a first capability, and a second pool of radio resources is configured to be used by wireless devices of a second mode and the first capability and/or a second capability, or of the first mode and the second capability.

The radio network node 12 may comprise a transmitting module 603, e.g. a transmitter or a transceiver. The radio network node 12, the processing circuitry 601, and/or the transmitting module 603 may be configured to transmit data or information, such as a SIB, to one or more wireless devices, which data or information indicates the configured pools of radio resources.

The radio network node 12 may comprise a receiving module 604, e.g. a receiver or a transceiver. The radio network node 12, the processing circuitry 601, and/or the receiving module 604 is configured to receive the indication from wireless devices indicating mode and/or capability.

The methods according to the embodiments described herein for the radio network node 12 are respectively implemented by means of e.g. a computer program product 605 or a computer program, comprising instructions, i.e., software code portions, which, when executed on at least one processor, cause the at least one processor to carry out the actions described herein, as performed by the radio network node 12. The computer program product 605 may be stored on a computer-readable storage medium 606, e.g. a disc, universal serial bus (USB) stick or similar. The computer-readable storage medium 606, having stored thereon the computer program product, may comprise the instructions which, when executed on at least one processor, cause the at least one processor to carry out the actions described herein, as performed by the radio network node 12. In some embodiments, the computer-readable storage medium may be a non-transitory computer-readable storage medium.

The radio network node 12 may further comprise a memory 607. The memory comprises one or more units to be used to store data on, such as information of pools of radio resources, capabilities of wireless devices, modes of wireless devices, used radio resources, applications to perform the methods disclosed herein when being executed, and similar. Thus, the radio network node 12 may comprise the processing circuitry and the memory, said memory comprising instructions executable by said processing circuitry whereby said radio network node 12 is operative to perform the methods herein. The radio network node 12 may further comprise a communication interface comprising e.g. a transceiver, transmitter, receiver and one or more antennas.

FIG. 7 is a block diagram depicting, in two embodiments, a wireless device such as the first wireless device 10 according to embodiments herein for handling communication of the wireless device 10 in the wireless communication network 1.

The wireless device 10 may comprise processing circuitry 701, e.g. one or more processors, configured to perform the methods herein.

The wireless device 10 may comprise a receiving module 702, e.g. a receiver or a transceiver. The wireless device 10, the processing circuitry 701, and/or the receiving module 702 is configured to receive the data or information, such as the SIB, from the radio network node 12. The data indicates pools of radio resources for wireless devices to use based on a mode and a capability of the wireless devices. The mode is a resource mode defined by manner of selecting radio resources and the capability is related to sidelink capability of the wireless devices. The resource mode may be defined by selecting radio resources at the wireless device or at the radio network node. The sidelink capability may be: a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these. The sidelink capability may be defined by version of the wireless devices. The pools may comprise at least two pools of radio resources, wherein a first pool of radio resources is configured to be used by wireless devices of a first mode and a first capability, and a second pool of radio resources is configured to be used by wireless devices of a second mode and the first capability and/or a second capability, or of the first mode and the second capability.

The wireless device 10 may comprise a using module 703. The wireless device 10, the processing circuitry 701, and/or the using module 703 is configured to use, based on the received data, one or more radio resources for communicating in the wireless communication network. The wireless device 10, the processing circuitry 701, and/or the using module 703 may be configured to use radio resources based on mode and capability of the wireless device 10 taking the received data into account.

The wireless device 10 may comprise a transmitting module 704, e.g. a transmitter or a transceiver. The wireless device 10, the processing circuitry 701, and/or the transmitting module 704 may be configured to transmit the indication indicating mode and/or capability of the wireless device 10.

The methods according to the embodiments described herein for the wireless device 10 are respectively implemented by means of e.g. a computer program product 705 or a computer program, comprising instructions, i.e., software code portions, which, when executed on at least one processor, cause the at least one processor to carry out the actions described herein, as performed by the wireless device 10. The computer program product 705 may be stored on a computer-readable storage medium 706, e.g. a disc, a USB stick or similar. The computer-readable storage medium 706, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 may further comprise a memory 707. The memory comprises one or more units to be used to store data on, such as capability, mode, radio resources, scheduling information, applications to perform the methods disclosed herein when being executed, and similar. Thus, the wireless device 10 may comprise the processing circuitry and the memory, said memory comprising instructions executable by said processing circuitry whereby said wireless device is operative to perform the methods herein. The wireless device 10 may further comprise a communication interface comprising e.g. a transceiver, transmitter, receiver and one or more antennas.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 8A:
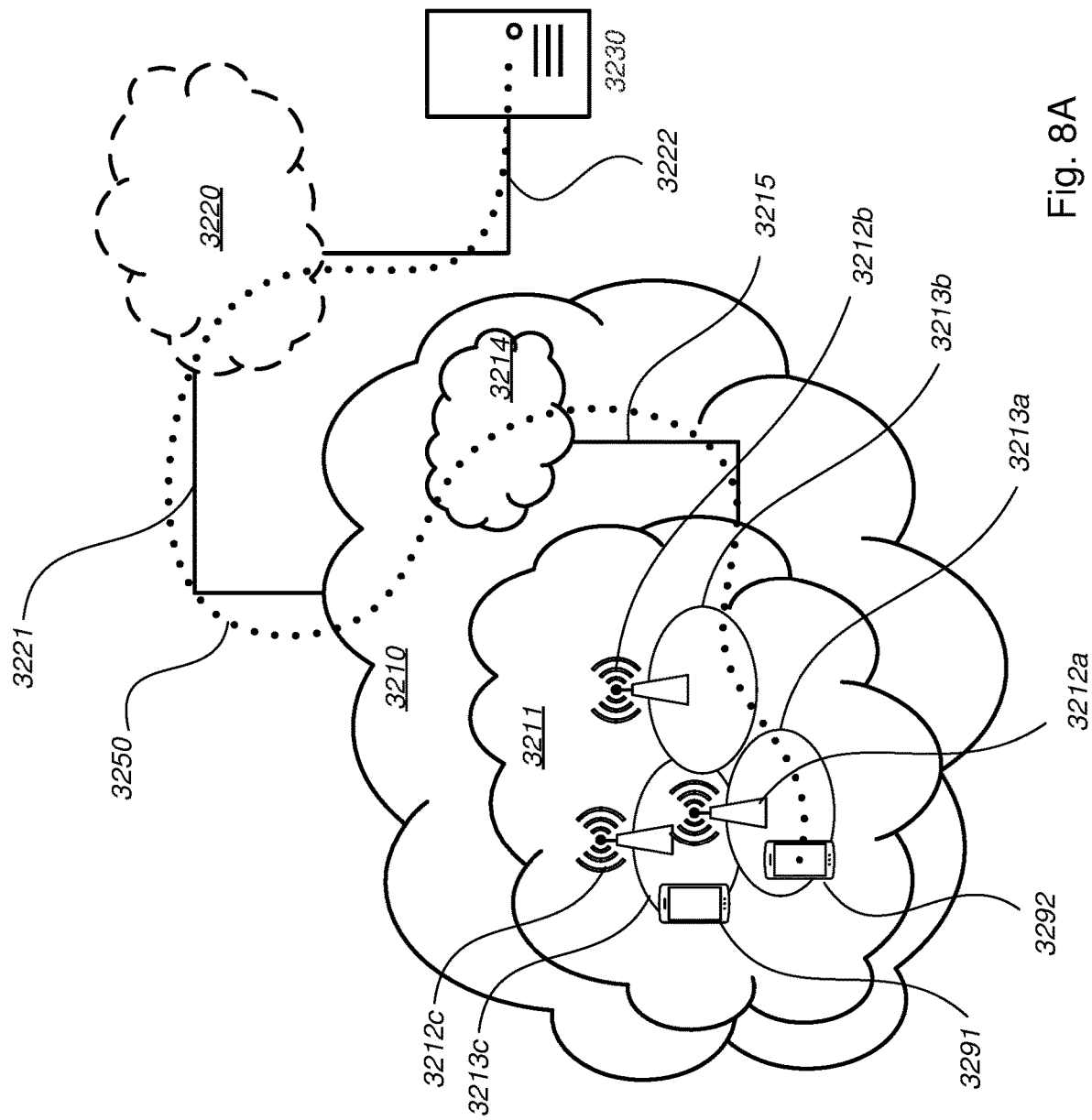
FIG. 8A schematically illustrates a telecommunication network connected via an intermediate network to a host computer.

With reference to FIG. 8A, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292, being an example of the wireless device herein, in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8A as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8B. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8B) served by the base station 3320. The communication interface 3326 may be configured to facilitate a connection 3360 to the host computer 3310. The connection 3360 may be direct or it may pass through a core network (not shown in FIG. 8B) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions.

The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8B:
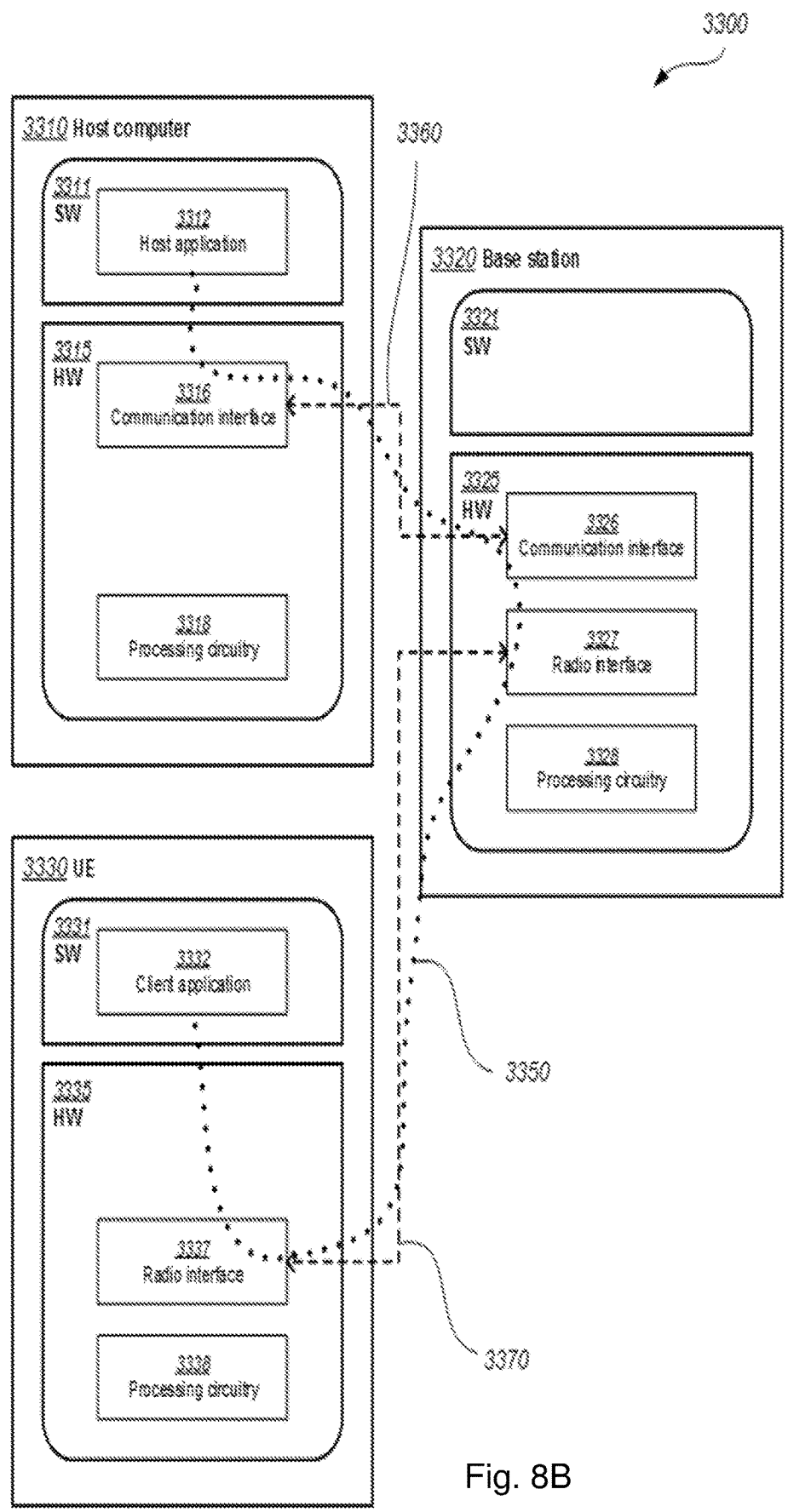
FIG. 8B is a generalized block diagram of a host computer communicating via a base station with a user equipment over a partially wireless connection.

It is noted that the host computer 3310, base station 3320 and UE 3330 illustrated in FIG. 8B may be identical to the host computer 3230, one of the base stations 3212a, 3212b, 3212c and one of the UEs 3291, 3292 of FIG. 8A, respectively. This is to say, the inner workings of these entities may be as shown in FIG. 8B and independently, the surrounding network topology may be that of FIG. 8A.

In FIG. 8B, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve usage of radio resources of different wireless devices that may affect the latency (reduce latency) and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
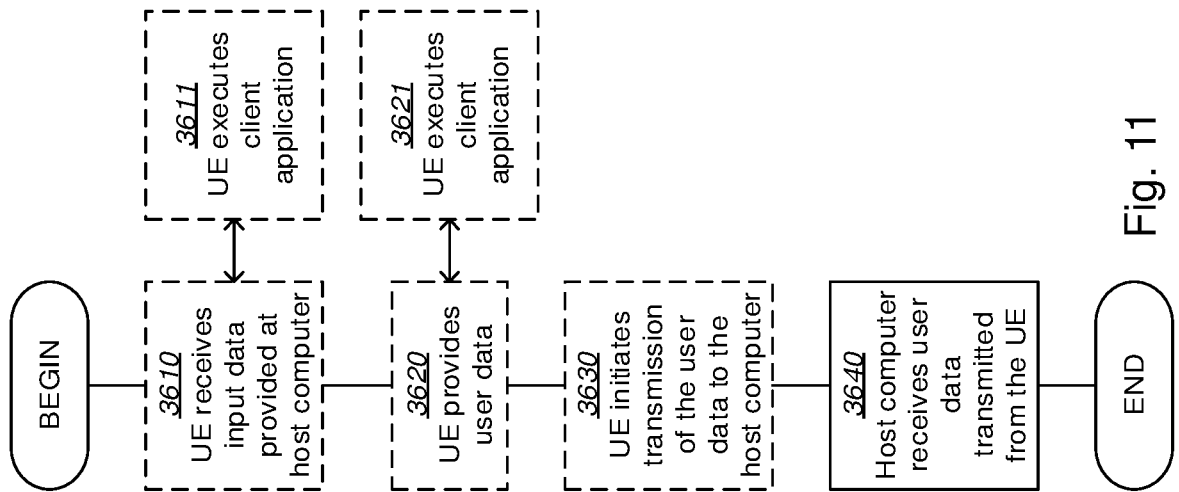

FIG. 11 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
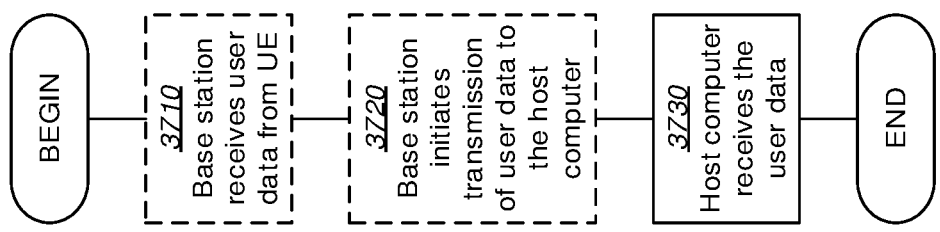

FIG. 12 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

REFERENCES

[1] TS 22.185 V14.2.1, "Service requirements for V2X services; Stage 1 (Release 14)"
[2] TS 36.321 V14.2.1, "Medium Access Control (MAC) protocol specification (Release 14)"
[3] TS 36.331 V14.1.0, "Radio Resource Control (RRC); Protocol specification (Release 14)"
[4] TS 36.213, V14.2.0, "Physical layer procedures (Release 14)"
[5] RP-170798, "New WID on 3GPP V2X Phase 2"
[6] R1-1708942, "Radio resource pool sharing between mode 3 and mode 4 UEs", Ericsson
[7] R1-1707450, "Discussion on resource pool sharing between mode 3 and mode 4", CATT

The invention claimed is:

1. A method performed by a radio network node for handling communication of wireless devices in a wireless communication network, the method comprising:
configuring a first pool of radio resources for use at least by i) wireless devices having a first resource mode for selecting radio resources and a first sidelink capability and ii) wireless devices having a second resource mode for selecting radio resources and a second sidelink capability; and
configuring a second pool of radio resources for use at least by wireless devices having the second resource mode and the first sidelink capability, wherein
the first pool is not for use by any wireless device of the second mode and first capability, and
the second pool is not for use by any wireless device of the first mode and first capability.

2. The method according to claim 1, further comprising transmitting data to one or more wireless devices, wherein the data indicates the configured pools of radio resources.

3. The method according to claim 1, wherein the resource mode is defined by selecting radio resources at the wireless device or at the radio network node.

4. The method according to claim 1, wherein the sidelink capability is a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these.

5. The method according to claim 1, wherein the sidelink capability is defined by version of the wireless devices.

6. The method according to claim 1, wherein the second pool is for use at least by i) the wireless devices having the second resource mode and the first sidelink capability and ii) wireless devices having the first resource mode and the second sidelink capability.

7. A method performed by a wireless device for handling communication of the wireless device in a wireless communication network, the method comprising:
receiving data from a radio network node, wherein the data indicates:
a) a first pool of radio resources for use at least by i) wireless devices having a first resource mode for selecting radio resources and a first sidelink capability and ii) wireless devices having a second resource mode for selecting radio resources and a second sidelink capability, and
b) a second pool of radio resources for use at least by wireless devices having the second resource mode and the first sidelink capability; and
using based on the received data one or more radio resources for communicating in the wireless communication network, wherein
the first pool is not for use by any wireless device of the second mode and first capability, and
the second pool is not for use by any wireless device of the first mode and first capability.

8. The method according claim 7, wherein the resource mode is defined by selecting radio resources at the wireless device or at the radio network node.

9. The method according to claim 7, wherein the sidelink capability is a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these.

10. The method according to claim 7, wherein the sidelink capability is defined by version of the wireless devices.

11. The method according to claim 7, wherein the second pool is for use at least by i) the wireless devices having the second resource mode and the first sidelink capability and ii) wireless devices having the first resource mode and the second sidelink capability.

12. A computer program product comprising a non-transitory computer-readable storage medium storing a computer program comprising instructions, which, when executed on at least one processor, cause the at least one processor to carry out the method of claim 1.

13. A radio network node for handling communication of wireless devices in a wireless communication network, wherein the radio network node comprises processing circuitry configured to:
configure a first pool of radio resources for use at least by i) wireless devices having a first resource mode for selecting radio resources and a first sidelink capability and ii) wireless devices having a second resource mode for selecting radio resources and a second sidelink capability; and
configure a second pool of radio resources for use at least by wireless devices having the second resource mode and the first sidelink capability, wherein
the first pool is not for use by any wireless device of the second mode and first capability, and
the second pool is not for use by any wireless device of the first mode and first capability.

14. The radio network node according to claim 13, wherein the radio network node is configured to
transmit data to one or more wireless devices, wherein the data indicates the configured pools of radio resources.

15. The radio network node according to claim 13, wherein the resource mode is defined by selecting radio resources at the wireless device or at the radio network node.

16. The radio network node according to claim 13, wherein the sidelink capability is a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these.

17. The radio network node according to claim 13, wherein the sidelink capability is defined by version of the wireless devices.

18. The radio network node according to claim 13, wherein the second pool is for use at least by i) the wireless devices having the second resource mode and the first sidelink capability and ii) wireless devices having the first resource mode and the second sidelink capability.

19. A wireless device for handling communication of the wireless device in a wireless communication network, wherein the wireless device comprises processing circuitry configured to:
receive data from a radio network node, wherein the data indicates:
a) a first pool of radio resources for use at least by i) wireless devices having a first resource mode for selecting radio resources and a first sidelink capability and ii) wireless devices having a second resource mode for selecting radio resources and a second sidelink capability, and
b) a second pool of radio resources for use at least by wireless devices having the second resource mode and the first sidelink capability; and
using based on the received data one or more radio resources for communicating in the wireless communication network, wherein
the first pool is not for use by any wireless device of the second mode and first capability, and
the second pool is not for use by any wireless device of the first mode and first capability.

20. The wireless device according claim 19, wherein the resource mode is defined by selecting radio resources at the wireless device or at the radio network node.

21. The wireless device according to claim 19, wherein the sidelink capability is a capability to set a resource reservation field in a sidelink capability information according to a semi persistent scheduling configuration, a capability to set a mode indicator in a sidelink capability information format, a capability to sense and provide feedback whether a resource is occupied, and/or a capability to receive indication of reserved resources and avoid using these.

22. The wireless device according to claim 19, wherein the sidelink capability is defined by version of the wireless devices.

23. The wireless device according to claim 19, wherein the second pool is for use at least by i) the wireless devices having the second resource mode and the first sidelink capability and ii) wireless devices having the first resource mode and the second sidelink capability.

* * * * *